United States Patent [19]
Aumann et al.

[11] Patent Number: 4,661,255
[45] Date of Patent: Apr. 28, 1987

[54] MULTILAYER FILTER MATERIAL, PROCESS FOR ITS MANUFACTURE AND THE USE THEREOF

[75] Inventors: Günther Aumann, Bruckmühl; Helmar Aigner, Kolbermoor; Hans-Karl Schuster, Bruckmühl, all of Fed. Rep. of Germany

[73] Assignee: Gessner & Co. GmbH, Fed. Rep. of Germany

[21] Appl. No.: 852,414

[22] Filed: Apr. 16, 1986

Related U.S. Application Data

[63] Continuation of Ser. No. 451,717, Dec. 20, 1982, abandoned.

[30] Foreign Application Priority Data

Oct. 22, 1982 [EP] European Pat. Off. ........ 82109784.7

[51] Int. Cl.⁴ .............................................. B01D 39/02
[52] U.S. Cl. ..................... 210/491; 210/505
[58] Field of Search .............. 210/503, 491, 504, 505; 55/505, 486, 528; 162/131, 129, 130, 93, 135; 264/177 F

[56] References Cited

U.S. PATENT DOCUMENTS

| | | | |
|---|---|---|---|
| 2,831,748 | 4/1958 | Finlayson et al. | 264/177 F X |
| 3,073,735 | 1/1963 | Till et al. | 210/505 X |
| 3,121,040 | 2/1964 | Shaw et al. | 264/177 F |
| 3,353,682 | 11/1967 | Pall et al. | 162/131 X |

Primary Examiner—Frank Spear
Attorney, Agent, or Firm—Wolf, Greenfield & Sacks

[57] ABSTRACT

A multilayer filter material is described which comprises a coarse and a fine filter layer, while the individual filter layers contain a share of natural fibres and are interconnected with each other on the paper machine, without the use of a bonding agent, whereby the coarse filter layer consists of a mixture of natural and synthetic fibres and at least one part of said synthetic fibres is structured, and synthetic fibres lying on the surface of the coarse filter layer protrude from the plane of the filter material.

Moreover a process for the manufacture of the multilayer filter material and its use is described.

The inventive multilayer filter material is distinguished against comparable conventional filters by an increased service life and a better degree of separation.

Figure 1:
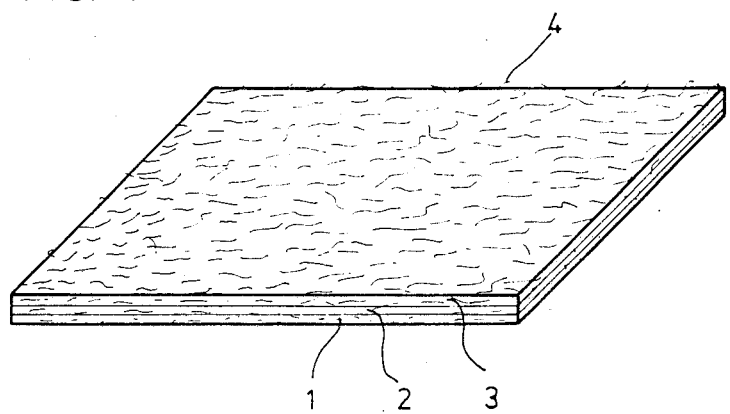
Figure 2:
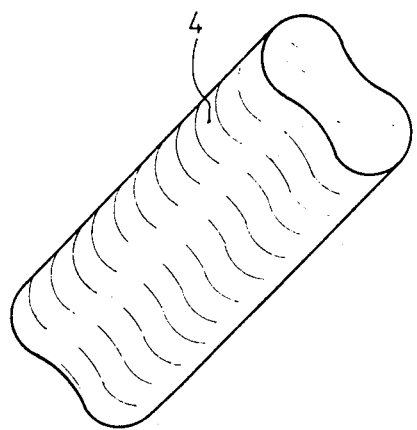

16 Claims, 2 Drawing Figures 1  2  3

MULTILAYER FILTER MATERIAL, PROCESS FOR ITS MANUFACTURE AND THE USE THEREOF

This application is a continuation of application Ser. No. 451,717, filed 12/20/82, now abandoned.

The invention concerns a multilayer filter material of a coarse and a fine filter layer, while said filter layers have a proportion of natural fibres, and the individual layers of fibrous suspensions are of different compositions and are interconnected without the use of a bonding agent on the paper machine. Further the invention concerns a process for the manufacture of a multilayer filter material and its use.

It is known that to filter impurities from the atmosphere, vapors and fluids filter materials should be used which are made of multiple layers of different porosities. The porosity decreases in the direction of flow, i.e. the individual layers have increasingly fine or narrow pores. A multilayer filter design is advantageous in that the coarser particles are already detained in the upper or on the upper coarse-pore layer without the fine pores becoming clogged. In this way a longer service life of the filter is ensured.

Processes and devices for the manufacture of multilayer filter papers on the paper machine are known. Accordingly the individual filter layers are interconnected without the use of a bonding agent. DE-AS No. 12 20 716 describes a device for the manufacture of multilayer fibrous sheets whereby the material supply takes place in horizontally arranged individual channels onto an inclined portion of an endless dewatering screen. In order to avoid the formation of a vortex in the sheet formation zone, the above publication provides that the dewatering should be undertaken using horizontally arranged suction boxes.

U.S. Pat. No. 2,928,765 describes a process for the manufacture of a double-layered air filter on the paper machine by the use of an inclined screen. Firstly via one channel the material for the coarse-pored layer is applied to the dewatering screen, after which in the next stage the material application for the fine-pored layer is made, which then comes to rest on the sheet of paper being formed.

In the known multilayer filter materials the porosity grades of the individual layers are chosen so that with respect to the desired separation degree and the service life, the optimal values are achieved. Here it has to be considered that a higher separation degree and a long service life are parameters the optimization of which run in contrary directions. If the longest possible service life is to be achieved, the coarsest pored paper possible is used, but that makes for a worse separation degree. On the other hand if the separation degree is to be as high as possible, it is necessary to use the finest-pored papers possible, which then become clogged relatively quickly due to the separated particles. Thereby the flow resistance on the filter is increased and the service life is cut short.

Due to DE-AS No. 22 32 178 a double-layered filter is known in which a plush fibre layer is stuck onto a fine-pored backing with the aid of an adhesive. Because of the adhesion of the fibres the fine pores of the base sheet become clogged with adhesive particles, which reduces the service life of the filter.

U.S. Pat. No. 3,353,682 describes a filter material which is substantially uniform in thickness, porosity and density. The various layers or strata of the filtering material are uniform with regard to fibre composition and differ only with respect to the fibre direction within the individual strata. In order to overcome fragility of the filtering material, a substrate is used onto which the filtering material is coated, and the various layers are interconnected by means of a bonding agent.

U.S. Pat. No. 2,834,730 discloses a multilayered filter material consisting of matted regenerated cellulose fibres together with cotton. Neither the material composition of the filtering material according to above US-PS nor the type of synthetic fibres can be compared to that of the present application. A further difference is that a bonding agent is used to interconnect the various layers.

The object of this invention is to make available a multilayer filter material, the layers of which are interconnected without the use of a bonding agent whereby at least one layer is provided which ensures a high separation degree of the filter material and at least one layer is provided which ensures a long service life of the filter. Further a process for the manufacture of a multilayer filter material is to be provided and its special use is described.

(a) a coarse filter layer composed of natural and synthetic fibres wherein substantially only the synthetic fibres are structured to have increased surface and wherein the synthetic fibres located on the outer surface protrude in different lengths from the plane of the filter material to provide a rough uneven surface which promotes loose filter cake build up in use;

(b) a fine filter layer composed of natural and synthetic fibres; and (c) wherein the coarse filter layer and the fine filter layer are interconnected solely by a fibrous interlock.

According to the invention the mutually contradictory functions "high separation degree" and "long service life" are each fulfilled optimally by the filter layers which are of different design. Apart from a fine filter layer, which is chosen so that it ensures the desired separation degree of the filter, a coarse filter layer is used which due to its rough surface favors the formation of a loose filter cake, whereby it is possible to prevent the flow resistance on the filter from rising too quickly and from decreasing the service life of the filter.

The rough surface on the top of the coarse filter layer consists of a mixture of natural and synthetic fibres whereby the synthetic fibres have a mainly structured composition. Structuring in this context signifies that the fibres have a cross-section which deviates from the circular form and is preferably X-, Y- or V-shaped or has a dumb-bell form. Because of this structuring the fibres have a larger surface. The synthetic fibres which can have a length of up to 40 mm are embedded in the natural fibres of the coarse filter layer and are held there by them.

The fibres coming to rest on the surface of the coarse filter layer are arranged so that they protrude from the material plane of the filter material. The alignment of the synthetic fibres and their protrusion from said plane of the filter material are effected by the inventive manufacturing process described below in combination with the synthetic structured fibres which are used. The invention does not exclude the possibility that a part of the natural or synthetic fibres located on the surface of the coarse filter layer which are non-structured can protrude from the plane of the filter material.

According to the control of the process, especially to the speed of dewatering on the inclined screen and to the direction of water removal, as well as depending on the synthetic fibres in use and especially on their structuring, diameter and fibre length, a more or less strongly erect positioning of the synthetic fibres on the surface of the coarse filter layer is achieved.

Because of the structured synthetic fibres protruding from the plane of the filter material the desired roughness of the surface of the filter material is attained, which avoids the build-up of the packed filter cake—at least over an increased period of time.

The multilayer filter material of the invention has a mixed zone between the coarse filter layer and the fine filter layer which comprises a mixture of fibre shares of the coarse filter- and of the fine filter-layers. The formation of the mixed zone results from the inventive manufacturing process of the filter paper in one working process on the paper machine, whereby the fibrous suspensions for the fine and the coarse filter layers are applied one immediately after the other on a dewatering screen designed as a screen with an inclined portion. Depending on the process control, especially the speed of dewatering on the inclined screen, there is a more or less strongly marked mixture of the supensions in the limiting phase whereby a mixed zone of varying thickness results. Due to the presence of the mixed zone, the filtration results of the inventive filter material is further positively influenced.

Moreover the multilayer filter material of the invention can contain one or more coarse filter layers as well as one or more fine filter layers which have different porosities, whereby the latter decrease in the direction of flow.

The proportion of the coarse filter layer to the fine filter layer can vary depending on the purpose of the filter material and is preferably in the range from 1:4 to 4:1, based on the weight ratio of the coarse filter layer to the fine filter layer.

The coarse filter layer of the multilayer filter materials of the invention contains structured synthetic fibres with a titer of from 1.2 to 15 dtex, preferably from 2.5 to 6 dtex, and a length from 0.4 to 40 mm, preferably from 2.0 to 20 mm.

The proportion of the structured synthetic fibres in the coarse filter layer amounts to 20 to 80% by weight, and preferably about 40% by weight, based on the weight of the coarse filter layer.

The synthetic fibres used in the coarse filter layer have preferably an X-,Y- or V-shape or according to a specially preferred embodiment are dumb-bell shaped. Due to the profile structure of the synthetic fibres they have particularly an increased surface.

A preferred synthetic structured fibre is the polyacryl nitrile fibre, and especially a dumb-bell shaped polyacryl nitrile fibre which is structured. The inventive polyacryl nitrile fibres are preferably made by dry spinning from acryl nitrile polymers. These polymers can be homopolymers, mixed polymers or polymer mixtures having at least 80% by weight of polymerised acryl nitrile. In addition, a polyacryl nitrile fibre with 100% of acryl nitrile can be used. Preferably a polyacryl nitrile fibre is used having a titer of 1.2 to 15 dtex and a length of from 4 to 8 mm.

The structured synthetic fibres of the coarse filter layer can also be multicomponent fibres, especially core-covering and bifilar fibres.

Apart from the above materials, the structured synthetic fibres of the coarse filter layer can also consist of a polyamide of a dicarboxylic acid and hexamethylenediamine, a polyamide fibre based on caprolactam, a polyester, a cellulose regenerate fibre or of glass fibres.

Apart from the structured synthetic fibres, the coarse filter layer can also contain a share of from 10 to 30% by weight based on the total weight of the coarse filter layer of non-structured synthetic fibres.

One preferred embodiment of the invention provides that the synthetic fibres located on the surface of the coarse filter layer protrude in statistic distribution, i.e. randomly, from of out of the plane of the filter material, i.e. that they protrude in differing lengths and at differing angles from said filter plane.

In a further embodiment the structured synthetic fibres on the surface of the coarse filter layer protrude predominantly at an acute angle from the plane of the filter material.

It is especially preferred when the structured synthetic fibres protrude from the plane of the filter material in differing lengths, especially in a length of from 0.5 to 20 mm, so that in this way the most uneven possible, i.e. the roughest, surface of the filter material is formed. The inventors have found that such a rough surface of the coarse filter layer is most suitable to favour the build-up of the loosest possible filter cake. This effect is reinforced when the structured fibre which protrude in differing lengths and at differing angles from the plane of the filter material, additionally have differing fibre diameters too.

The natural fibres in the coarse filter layer should have a preferred diameter of 20 to 50 microns, and be 2.5–6 mm long.

In one preferred embodiment of the invention the natural fibres in the coarse filter layer stem from coniferous woods. It is especially preferred when the natural fibres in the coarse filter layer are composed of a highly porous pine cellulose.

Moreover the natural fibres in the coarse filter layer can also contain linters of the cotton plant having a diameter of 20–25 microns and a length of from 2–6 mm.

The share of the natural fibres in the coarse filter layer is preferably 20 to 80% by weight, based on the total weight of the coarse filter layer.

The fine filter layer of the inventive material is preferably of natural fibres having a diameter of 7 to 20 microns, preferably from 7 to 12 microns, and a length of from 0.5 to 3.5 mm. One preferred embodiment contains a fine filter layer which contains fibres from deciduous woods with a diameter of 7 to 12 microns and a length of 0.5 to 1.5 mm.

The smaller pore diameter of the fine filter layer is obtained by means of the share of fine fibres which can range from 15 to 50% by weight.

It is preferable that the fine filter layer should contain an eucalyptus fibre.

Further the fine filter layer can also contain a share of from 5 to 40% of synthetic fibres based on the weight of the fine filter layer.

The fine filter layer can also have a filler which is normally used for filter materials, but in particular only fillers of a fibrous nature should be used. Especially suitable is for example diatomaceous earth.

The filter material of the invention is preferably provided with an impregnation to increase its mechanical strength as well as its thermal and chemical stability. For the impregnation agent the phenol resins from the group of the aminoplasts, phenoplasts, epoxi-resins, vinyl resins and urethanes as well as acrylate resins are especially suitable. It is preferred that the impregnation should be applied on the side of the coarse filter layer and should penetrate through it. For impregnation 5-30% by weight of resin is used, based on the total weight of the filter material. When carrying out subsequent processing of the filter material it is necessary to prevent the surface of the coarse filter layer from losing its roughness. But it is possible to score the filter material to enlarge the surface after the impregnation stage.

In addition the filter material can have a support layer between the coarse and the fine layers to improve its strength and its stiffness. This support layer can be made of a synthetic, semisynthetic or metallic material and can be present as a fabric of any supporting structure, texture or as an endless filament, zig-zag strip etc. It is especially preferred when the supporting layer is made of cotton.

One especially preferred embodiment of the filter material of the invention has the following features and is composed as follows:

(a) a coarse filter layer of a mixture of structured polyacryl nitrile fibres having a titer of from 1.2 to 15 dtex and a length of from 4-8 mm, and of a highly porous pine cellulose having a diameter of from 20 to 50 microns and a length of 2.5-6 mm, and (b) a fine filter layer of mainly natural fibres having a thickness of from 7 to 12 microns and a length of 0.5 to 3.5 mm, (c) whereby acryl nitrile fibres on the surface of the coarse filter layer protrude from the plane of the filter material in differing lengths and differing angles.

In the above preferred filter material the share of the structured synthetic fibres in the coarse filter layer amounts to 40% by weight, that of the highly porous pine cellulose to 60% by weight, based on the total weight of said coarse filter layer. The ratio of the coarse filter layer to the fine filter layer is 1:3. The thickness of the filter material amounts preferably to 0.6 to 0.7 mm.

The inventive filter material is produced by a special process, whereby the supply of the material emergence of various fibrous suspensions which provide the layers of differing porosity is carried out in at least two directly superimposed individual channels onto an endless dewatering screen designed as a screen with an inclined portion, and the filter material is dewatered, impregnated and dried, whereby (a) firstly via at least one of the individual channels arranged in the lower part of the material supply an aqueous fibrous suspension of primarily natural fibres with a diameter of from 7 to 20 microns and a length of 0.5-3.5 mm is applied and (b) then via at least one of the individual channels in the upper part of the material supply, an aqueous suspension made of a mixture of structured synthetic fibres with a titer of from 1.2 to 15 dtex and a length of 0.5 to 40 mm and natural fibres having a diameter of 20 to 50 microns and a length of 2.5 to 6 mm is applied on the inclined portion of the screen.

The dewatering of the fibrous suspensions applied to the inclined screen is carried out preferably using a water outlet which forms approximately a right-angle to the flow direction of the fibrous suspensions. This ensures a deflection of the pulp water whereby a vortex formation is created in the sheet formation zone.

An important feature of the invention is to be found in the fact that first the fibrous suspension is applied to the inclined portion of the screen which leads to the formation of the fine-pored filter layer, and the fibrous suspension which contains the structured synthetic fibres is applied last. In this way the structured synthetic fibres can become erect, favoured by the above manufacturing process, and can protrude from the plane of the filter paper.

The individual filter layers of various composition of the filter material produced by the inventive process possess a good mutual interlock since the individual layers are not strictly separated from each other but are interconnected by means of a mixed zone. Thus a breakdwon of the individual layers cannot take place due to the influence of heat or of moisture.

According to the invention in the above material emergence on the paper machine a support layer can be inserted composed of a synthetic, semi-synthetic or metallic material in the form of a fabric or as an endless filament between the coarse filter layer and the fine filter layer into the filter material.

The filter material of the invention is especially suitable for the filtration of impurities from the atmosphere, gases, vapors and fluids. It is especially useful as an air filter, filter for gas turbines as well as a dust filter for industrial dust, in vapor escape hoods, as a filter for air conditioning units, as an oil filter, fuel filter, and as an hydraulic oil filter. Particularly the filter material of the invention is suited for use in autos.

When used as an auto air filter the filter material has preferably a thickness of from 0.5 to 0.8 mm, with a special preference for 0.6 to 0.7 mm. For optimal results the dust absorption as well as the space required should both be considered.

FIG. 1 shows a schematic drawing of the filter of the invention whereby the reference numerals have the following meanings:

1=fine filter layer, 2=mixed zone, 3=coarse filter layer 4=synthetic fibres protruding from the plane of the filter material, which are structured.

FIG. 2 shows a section of FIG. 1 and represents a structured synthetic fibre of dumbbell shape which protrudes from the plane of the filter material.

EMBODIMENT

On a paper machine equipped with a screen which is designed to have an inclined portion, and two superimposed individual channels for the supply of the pulp emergence, firstly an aqueous fibrous suspension of natural fibres with a diameter of from 7 to 12 microns and a length of from 0.5 to 3.5 mm (solid share of the suspension 0.08% by weight) was applied in the lower channel to the inclined portion of the screen for the formation of a fine filter layer and was dewatered.

Then via upper channel an aqueous fibrous suspension of a mixture of 40% by weight of dumbbell shaped structured polyacryl nitrile fibres with a titer of from 3 to 5 dtex and a length of from 4 to 8 mm and 60% by weight of a highly porous pine cellulose with a diameter of from 20 to 50 microns and a length of from 2.5 to 6 mm (solid share of the suspension: 0.08% by weight) was applied to the fine filter layer already forming to form the coarse filter layer and was dewatered.

The share of the coarse filter layer to the fine filter layer amounted to 2:1 in the filter material formed. For dewatering the water outlet was carried out at right angles to the flow direction of the fibrous suspension.

The drying of the filter material was done on the paper machine at 136° C.

Using this process according to the invention filter materials of various weights per unit of area (e.g. LX 1.1 and LX 1) were produced which were tested as described below:

On the basis of the following examples and comparative examples the improved qualities of the inventive filter material will be shown with respect to service life and to separation degree.

The performance of the filter is defined by the dust absorption until the arrival at a certain flow resistance as well as by the dust permeability of the filter, from which the separation degree in per cent is found.

The determination of the dust absorption which is a measure of the service life of the filter as well as of the dust permeability from which the separation degree can be computed was done by a gravimetric process developed by the applicant.

For this purpose the filter material to be examined was fitted into an apparatus so that a dust-laden air flow had to pass through the filter. For the tests a standardised dust was used which can be obtained from the firm GMC-FLINT, Mich., USA with the name AC-GM-AIRCLEANER. The injection of the air into the apparatus was performed with an air throughput of 1.3 l/s. The free filter surface was 78.5 cm². The test was carried out each time up to an increase of the pressure over the filter material to 200 mm hydraulic head and was then stopped. The dust separated onto the filter material as well as the dust quantity which could pass through the filter material and was collected on a second very fine-pored filter was determined gravimetrically.

TEST 1

In this test an inventive filter material (LX1.1) was used with a weight per unit area of 119 g/m² and a thickness of 0.78 mm.

The conduct of the test was as above whereby a dust absorption of 390 to 400 g/m² and a separation degreee of 99.7% were found.

TEST 2

Using the inventive filter material (LX 1) with a weight per unit area of 105 g/m² and a thickness of 0.65 mm under the above test conditions a dust absorption of 300 g/m² and a separation degree of 99.6% were found.

Comparative Test

For comparison monolayered conventional filter material (L1) with a weight per unit area of 105 g/m² and a thickness of 0.65 mm was used. The comparative filter material contained 100% by weight of natural fibres with a diameter of 7–50 microns and a length of 0.5 to 6.0 mm.

Under the above test conditions a dust absorption of the comparative filter material of about 200 g/m² was attained. The separation degree was found to be 99.4%.

As the tests above show, the double-layered inventive filter LX 1 (test 2) causes an approximately 50% increase in dust absorption against a conventional filter material with one layer and thus a corresponding increase in service life.

When the inventive filter material LX 1.1 was applied as in Test 1 in a thickness which is about 24% greater than that of the filter LX 1, there is an increase of about 100% in dust absorption by comparison with the monolayered conventional filter material L1.

In the table below the results of the above tests are summarized:

TABLE

Determination of dust absorption and of separation degree until the attainment of a defined flow resistance:

| Filter | Filter thickness | Density g/cm³ | Dust Absorption g/m² | Degree of Separation % |
|---|---|---|---|---|
| LX 1 (inventive) | 0.65 | 0.158 | 300 | 99.6 |
| LX 1.1 (inventive) | 0.78 | 0.153 | 390–400 | 99.7 |
| L 1 (as per prior art) | 0.65 | 0.166 | 200 | 99.4 |

We claim:

1. Multilayer filter material, comprising:
   (a) a coarse filter layer composed of natural and synthetic fibres wherein substantially only the synthetic fibres are structured to have increased surface and wherein the synthetic fibres located on the outer surface protrude in different lengths from the plane of the filter material to provide a rough uneven surface which promotes loose filter cake build up in use;
   (b) a fine filter layer composed of natural and synthetic fibres; and
   (c) wherein the coarse filter layer and the fine filter layer are interconnected solely by a fibrous interlock.

2. Multilayer filter material according to claim 1, wherein the coarse layer of the filter contains structured synthetic fibres with a titer of from 1.2 to 15 dtex and a length of 0.5 to 40 mm.

3. Multilayer filter material according to claim 1, wherein the structured synthetic fibres of the coarse filter layer have an X, Y or V shape or are designed in dumb-bell form.

4. Multilayer filter material according to claim 1, wherein the structured synthetic fibres of the coarse filter layer constitute multi-component-fibres.

5. Multilayer filter material according to claim 4, wherein the multi-component-fibres consist essentially of core-covering fibres and bifilar fibres.

6. Multilayer filter material according to claim 1, wherein the synthetic fibres of the coarse filter layer are composed essentially of polyacrylnitrile fibre.

7. Multilayer filter material according to claim 1, wherein the coarse filter layer comprises natural fibres with a diameter of 20 to 50 microns and a length of 2.5 to 6.0 mm.

8. Multilayer filter material according to claim 1, wherein the fine filter layer contains natural fibres with a diameter of 7 to 20 microns and a length of from 0.5 to 3.5 mm.

9. Multilayer filter material according to claim 1, wherein the fine filter layer consists of between 0.1 to 50% of synthetic fibres.

10. Multilayer filter material according to claim 1, wherein the coarse filter layer consists of several layers with different porosity.

11. Multilayer filter material according to claim 1, wherein the weight of the coarse filter layer is between 25% and 400% of the weight of the fine filter layer.

12. Multilayer filter material according to claim 1, further comprising a mixed zone between the coarse filter layer and the fine filter layer, said mixed zone comprising a mixture of the fibres of the coarse filter layer and the fine filter layer, wherein all filter layers are interconnected solely by a fibrous interlock.

13. Multilayer filter material according to claim 1, wherein
(a) the coarse filter layer comprises mixture of structured polyacrylnitrile fibres having a titer of from 1.2 to 15 dtex and a length of 4 to 8 mm and a highly porous coniferous cellulose with a diameter of from 20 to 50 microns and a length of from 2.6 to 6 mm, and the
(b) fine filter layer comprises primarily natural fibres having a diameter of 7 to 12 microns and a length of from 0.5 to 3.5 mm, and
(c) whereby the acrylnitrile fibres lying on the surface of the coarse filter layer protrude in different lengths and at different angles form the plane of said filter material.

14. A process for the manufacture of the multilayer filter material according to claim 1, whereby the supply of the pulp emergence of different fibre material suspensions takes place in at least two directly superimposed channels onto an inclined portion of a dewatering endless screen, and the filter material is dewatered, impregnated and dried, comprising the steps of:

(a) applying an aqueous fibrous suspension via at least one of the individual channels arranged in the lower part of the pulp supply, said suspension comprising primarily natural fibres having a diameter of from 7 to 20 microns and a length of from 0.5 to 3.5 mm, and
(b) applying an aqueous fibrous suspension of a mixture of structured synthetic fibres having a titer of 1.2 to 15 dtex and a length of 0.5 to 40 mm, and natural fibres having a diameter of 20 50 microns and a length of from 2.5 to 6 mm to the inclined portion of the screen via at least one of the individual channels arranged in the upper part of the pulp supply.

15. The process for the manufacture of a multilayered filter material according to claim 14, further comprising inserting a support layer between the coarse filter layer and the fine filter layer.

16. The process for the manufacture of a multilayer filter material according to claim 14, wherein the support layer consists of a synthetic, semi-synthetic or metallic material.

* * * * *